US010763933B1

(12) United States Patent
Su et al.

(10) Patent No.: US 10,763,933 B1
(45) Date of Patent: Sep. 1, 2020

(54) PRECODING METHOD, BASE STATION AND COMPUTING CIRCUIT

(71) Applicant: Realtek Semiconductor Corp., HsinChu (TW)

(72) Inventors: Hsuan-Jung Su, Taipei (TW); Jhe-Yi Lin, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/868,564

(22) Filed: May 7, 2020

Related U.S. Application Data

(60) Provisional application No. 62/866,642, filed on Jun. 26, 2019.

(51) Int. Cl.
  *H04B 7/02* (2018.01)
  *H04B 7/06* (2006.01)
  *H04B 17/336* (2015.01)
  *H04W 88/08* (2009.01)

(52) U.S. Cl.
  CPC ......... *H04B 7/0617* (2013.01); *H04B 17/336* (2015.01); *H04W 88/08* (2013.01)

(58) Field of Classification Search
  CPC .... H04B 7/0617; H04B 17/336; H04W 88/08
  USPC ................................................. 375/267, 299
  See application file for complete search history.

(56) References Cited

U.S. PATENT DOCUMENTS

| | | | | |
|---|---|---|---|---|
| 2010/0026560 | A1* | 2/2010 | Xia | G01S 3/74 342/173 |
| 2019/0081682 | A1* | 3/2019 | Wu | H04B 7/0626 |
| 2019/0260459 | A1* | 8/2019 | Jeon | H04B 7/0491 |
| 2020/0007205 | A1* | 1/2020 | Park | H04B 7/0469 |
| 2020/0186216 | A1* | 6/2020 | Hao | H04B 1/7102 |

* cited by examiner

*Primary Examiner* — Don N Vo
(74) *Attorney, Agent, or Firm* — Winston Hsu

(57) ABSTRACT

A precoding method is provided. The precoding method includes computing a relaxed beamforming matrix according to multiple desired channel correlation matrices and multiple interfering channel correlation matrices; computing an approximated beamforming matrix according to the relaxed beamforming matrix; computing multiple degradations corresponding to the data streams according to multiple relaxed beamforming vectors within the relaxed beamforming matrix and multiple approximated beamforming vectors within the approximated beamforming matrix; selecting a selected data stream index according to the degradations; decomposing a selected relaxed beamforming vector corresponding to the selected data stream index into a first vector and a second vector; and updating the approximated beamforming matrix according to the first vector and augmenting the approximated beamforming matrix according to the second vector, to obtain an updated-and-augmented beamforming matrix.

20 Claims, 5 Drawing Sheets

PRECODING METHOD, BASE STATION AND COMPUTING CIRCUIT

CROSS REFERENCE TO RELATED APPLICATIONS

This application claims the benefit of U.S. provisional application No. 62/866,642, filed on Jun. 26, 2019, which is incorporated herein by reference.

BACKGROUND OF THE INVENTION

1. Field of the Invention

The present application relates to a precoding method, a base station and a computing circuit, and more particularly, to a precoding method, a base station and a computing circuit capable of enhancing a sum rate with low computation complexity.

2. Description of the Prior Art

As the fifth generation (5G) wireless networks grow, the millimeter wave (mmWave) communication system becomes a promising solution to increase network capacity. An advantage of the mmWave system is its short wavelength enables plenty of antennas to be packed in a certain physical dimension, allowing for large-scale spatial multiplexing and highly directional beamforming. A design challenge of the mmWave systems is that millimeter wave would experience severe path loss, penetration loss and rain fading as compared to the current cellular bands.

Since a number of antennas is large, it is luxurious to allocate one radio frequency (RF) chain dedicated for one antenna. Practically, a number of RF chains is less than a number of (transmit) antennas. Hybrid beamforming, partitioning the signal processing operation into digital precoding and analog precoding, is a new signal processing concept for the mmWave communication system, which can reduce the number of RF chains. To achieve good performance, designing digital precoder and analog precoder in an iterative fashion has been proposed. However, designing digital and analog precoders iteratively is too complicated.

Therefore, it is necessary to improve the prior art.

SUMMARY OF THE INVENTION

It is therefore a primary objective of the present application to provide a precoding method, a base station and a computing circuit capable of enhancing a sum rate with low computation complexity.

An embodiment of the present application provides a precoding method, applied in a base station. The base station comprises a computing circuit, an analog precoder, multiple antennas and multiple radio frequency (RF) chains. The analog precoder is coupled between the plurality of antennas and the plurality of RF chains. The base station transmits multiple data streams toward the plurality of users. The precoding method comprises computing a relaxed beamforming matrix according to multiple desired channel correlation matrices and multiple interfering channel correlation matrices, wherein the relaxed beamforming matrix comprises a plurality of relaxed beamforming sub-matrices corresponding to the plurality of users, one relaxed beamforming sub-matrix is generated according to a desired channel correlation matrix and an interfering channel correlation matrix corresponding to one user; computing an approximated beamforming matrix according to the relaxed beamforming matrix, wherein entries within the approximated beamforming matrix have a constant magnitude; computing multiple degradations corresponding to the plurality of data streams according to multiple relaxed beamforming vectors within the relaxed beamforming matrix and multiple approximated beamforming vectors within the approximated beamforming matrix; selecting a selected data stream index according to the plurality of degradations; decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix; wherein the analog precoder performs a first precoding operation according to the updated-and-augmented beamforming matrix.

An embodiment of the present application provides a base station, comprising multiple antennas; multiple radio frequency (RF) chains; an analog precoder, coupled between the antennas and the RF chains, configured to perform a first precoding operation; a computing circuit, configured to perform the following steps: computing a relaxed beamforming matrix according to multiple desired channel correlation matrices and multiple interfering channel correlation matrices, wherein the relaxed beamforming matrix comprises multiple relaxed beamforming sub-matrices corresponding to the users, one relaxed beamforming sub-matrix is generated according to a desired channel correlation matrix and an interfering channel correlation matrix corresponding to one user; computing an approximated beamforming matrix according to the relaxed beamforming matrix, wherein entries within the approximated beamforming matrix have a constant magnitude; computing multiple degradations corresponding to the data streams according to multiple relaxed beamforming vectors within the relaxed beamforming matrix and multiple approximated beamforming vectors within the approximated beamforming matrix; selecting a selected data stream index according to the degradations; decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix; wherein the analog precoder performs the first precoding operation according to the updated-and-augmented beamforming matrix.

An embodiment of the present application provides a computing circuit, disposed within a base station. The base station comprises a computing circuit, an analog precoder, multiple antennas and multiple radio frequency (RF) chains. The analog precoder is coupled between the antennas and the RF chains. The computing circuit comprises a processing unit; and a memory, configured to store a program code, wherein the computing circuit is further configured to perform the following steps: computing a relaxed beamforming matrix according to multiple desired channel correlation matrices and multiple interfering channel correlation matrices, wherein the relaxed beamforming matrix comprises a plurality of relaxed beamforming sub-matrices corresponding to the users, one relaxed beamforming sub-matrix is generated according to a desired channel correlation matrix and an interfering channel correlation matrix corresponding to one user; computing an approximated beamforming matrix according to the relaxed beamforming matrix, wherein entries within the approximated beamforming matrix have a constant magnitude; computing multiple degradations corresponding to the data streams according to multiple relaxed beamforming vectors within the relaxed beamforming matrix and multiple approximated beamforming vectors within the approximated beamforming matrix; selecting a selected data stream index according to the degradations; decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix; wherein the analog precoder performs a first precoding operation according to the updated-and-augmented beamforming matrix.

These and other objectives of the present disclosure will no doubt become obvious to those of ordinary skill in the art after reading the following detailed description of the preferred embodiment that is illustrated in the various figures and drawings.

DETAILED DESCRIPTION

In this disclosure, the wordings of "beamforming" and "precoding" are used interchangeably. A linear operation (e.g., precoding operation) is represented by its corresponding (precoding) matrix. User k indicates the k-th user. Data stream d indicates the d-th data stream.

Figure 1:
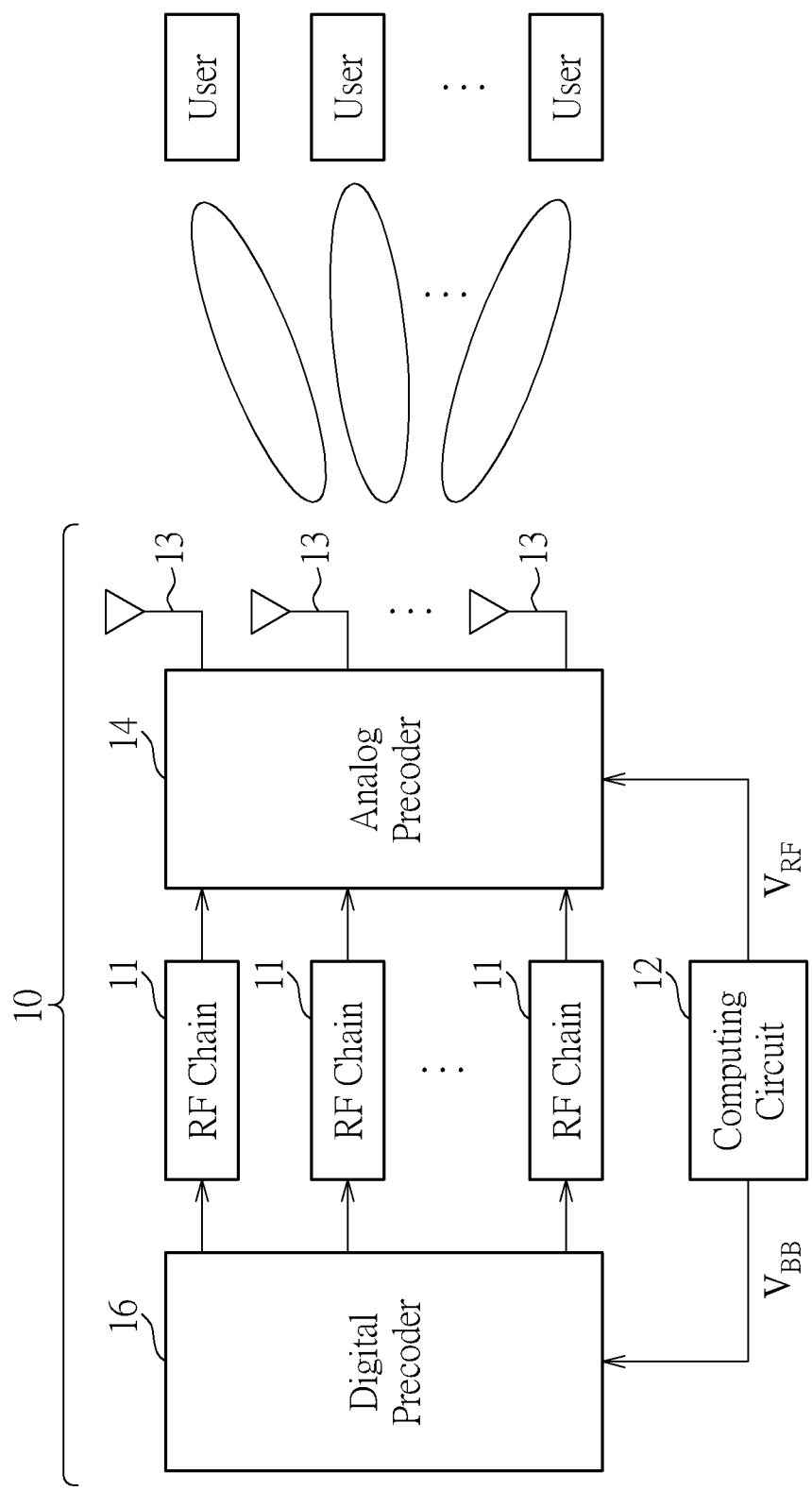
FIG. 1 is a schematic diagram of a base station according to an embodiment of the present application.

FIG. 1 is a schematic diagram of a base station 10 according to an embodiment of the present application. The base station 10 may be applied in a millimeter wave (mm-Wave) communication system, which is configured to transmit a plurality of data streams toward the plurality of users. The term "user" in the present application is referred to "user equipment", electronic device receiving data transmitted from the base station 10, which may be mobile phone, tablet computer, wearable device, for example. The base station 10 comprises a computing circuit 12, an analog precoder 14, a digital precoder 16, a plurality of radio frequency (RF) chains 11 and a plurality of antennas 13. The digital precoder 16 receives the plurality of data streams and is configured to perform a digital precoding operation on a (baseband) data s of the plurality of data streams. The RF chains 11 upconverts the baseband data s toward a radio frequency. The analog precoder 14, coupled between the RF chains 11 and the antennas 13, is configured to perform an analog precoding operation on outputs of the RF chains. The antennas 13 transmit outputs of the analog precoder 14 toward the users. The computing circuit 12 is configured to compute an analog beamforming matrix $V_{RF}$ for the analog precoder 14 to perform the analog precoding operation and compute a digital beamforming matrix $V_{BB}$ for the digital precoder 16 to perform the digital precoding operation.

Figure 2:
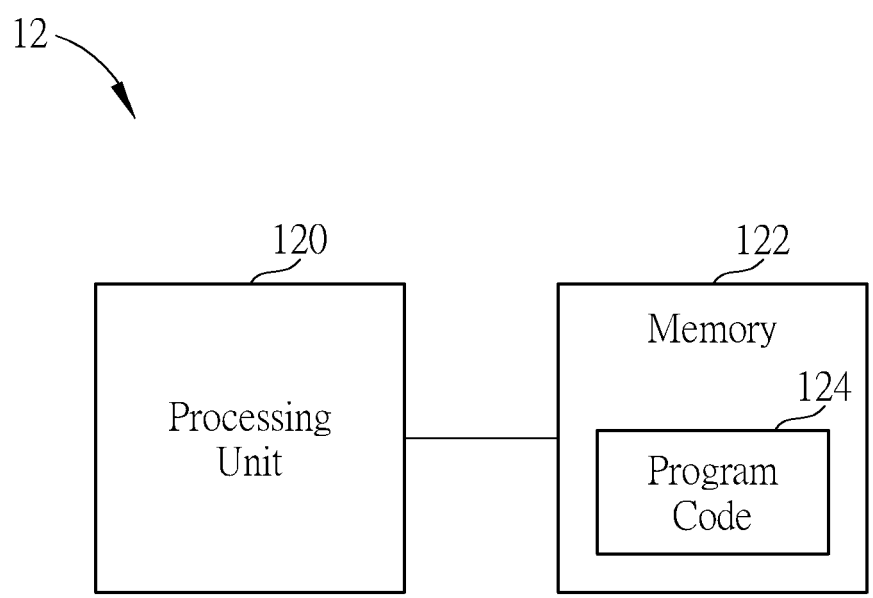
FIG. 2 is a schematic diagram of a computing device according to an embodiment of the present application.

FIG. 2 is a schematic diagram of the computing circuit 12 according to an embodiment of the present application. The computing circuit 12 may comprise a processing unit 120 and a memory 122. The memory 122 is configured to store a program code 124 to instruct the processing unit 120 to compute $V_{RF}$ and $V_{BB}$. The memory 122 may be a non-volatile memory (NVM), e.g., an electrically erasable programmable read only memory (EEPROM) or a flash memory, and not limited thereto. The processing unit 120 may be a process, e.g., a digital signal processor (DSP) or a central processing unit (CPU), and not limited thereto.

In an embodiment, the digital precoder 16 may be realized by ASIC (Application-Specific Integrated Circuit) or DSP.

In an embodiment, the analog precoder 14 may be realized by a plurality of phase shifters. In this regard, entries within/of the beamforming matrix $V_{RF}$ may all have a constant magnitude. In an embodiment, every entry within the beamforming matrix $V_{RF}$ may have a magnitude equal to 1, i.e., $|V_{RF}(p, q)|=1$ for all p, q, where $V_{RF}(p, q)$ denotes the $(p, q)^{th}$ entry of the beamforming matrix $V_{RF}$.

The computing circuit 12 computes $V_{RF}$ and $V_{BB}$ to maximize an achievable sum rate, given that the analog precoder 14 is realized by the phase shifters. Mathematically, the computing circuit 12 intends to solve the problem shown in equations (1a)-(1c) below. In this application, solving an optimization problem may be not only referred to "finding a global optimal solution", but also referred to "approaching an optimum by a sub-optimal solution".

$$\max_{V_{RF}, V_{BB}} \sum_{k=1}^{K} R_k \quad (1a)$$

$$\text{s.t.} \quad tr(xx^H) \leq P_{max} \quad (1b)$$

$$|V_{RF}(p, q)| = 1, \forall p, q \quad (1c)$$

In equations (1a)-(1c), $R_k$ denotes an achievable rate of a user k (where k is a user index), and x denotes a transmitted signal transmitted by the antennas 13. Equation (1b) represents a transmission power constraint, and equation (1c) represents a constant magnitude constraint.

Specifically, the transmitted signal x can be expressed as $$x = V_{RF} V_{BB} s = V_{RF} \sum_{k=1}^{K} V_{BB,k} s_k,$$

where $s=[s_1^T, \ldots, s_K^T]^T$ and $V_{BB}=[V_{BB,1}, \ldots, V_{BB,K}]$. Signal vectors is a $(n_S \times 1)$ vector and comprises transmit data of the plurality of data streams corresponding to a specific time, where $n_s$ denotes a number of the plurality of data streams intended for the plurality of users, and K denotes a number of users. Signal vector $s_k$ represents a data vector intended for the user k. $V_{BB}$ is a $(n_{RF} \times n_S)$ matrix, where $n_{RF}$ represents a number of the RF chains. $V_{BB,k}$ represents a beamforming sub-matrix corresponding to the user k. In an embodiment, $D_k$ data stream(s) is(are) provided for the user k and $\Sigma_k D_k = n_S$. In an embodiment, the $n_S$ data streams may be equally provided to the K users, and each user is served by D data streams, i.e., $n_S = KD$. In an embodiment, $n_S \leq n_{RF} < n_T$, wherein $n_T$ denotes a number of transmit antennas, i.e., the antennas 13. It means that, the base station 10 may be equipped with more RF chains than the data streams, and equipped with more antennas than the RF chains.

A received signal $y_k$ at the user k can be expressed as equation (2). $H_k$ denotes channel matrix from the base station 10 to the user k, and $n_k$ denotes noise received by the user k, where $n_k$ may obey complex Gaussian distribution with variance $\sigma_n^2$, e.g., $n_k \sim CN(0, \sigma_n^2 I)$. The achievable rate $R_k$ in (1a) can be expressed as equation (3), where $C_k$ in (3) can be expressed as equation (4).

$$y_k = H_k V_{RF} V_{BB,k} s_k + H_k V_{RF} \left( \sum_{k'=1, k' \neq k}^{K} V_{BB,k'} s_{k'} \right) + n_k \quad (2)$$

$$R_k = \log_2 |I + C_k^{-1} H_k V_{RF} V_{BB,k} V_{BB,k}^H V_{RF}^H H_k^H| \quad (3)$$

$$C_k = H_k V_{RF} \left( \sum_{k'=1, k' \neq k}^{K} V_{BB,k'} V_{BB,k'}^H \right) V_{RF}^H H_k^H + \sigma_n^2 I \quad (4)$$

A strategy to solve problem (1) includes, a) assuming $V_{BB}$ as an initial constant $V_{BB}^{(0)}$, substituting $V_{BB}^{(0)}$ into equations (1a)-(1c) and solving problem (1) by treating $V_{RF}$ as variable, in order to obtain a solution of $V_{RF}$, denoted as $V_{RF}^{(S)}$; b) substituting $V_{RF}^{(S)}$ into equations (1a)-(1c) as constant and solving problem (1) by treating $V_{BB}$ as variable, in order to obtain a solution of $V_{BB}$, denoted as $V_{BB}^{(S)}$.

Note that, in paragraphs regarding solving the problem of the present application, the symbols $V_{RF}$ and $V_{BB}$ represent matrix variables; in FIG. 1 and related paragraphs, the symbol $V_{RF}/V_{BB}$ defines the precoding operation the precoder 14/16 performs. In practical precoding operation, the solutions $V_{RF}^{(S)}$ and $V_{BB}^{(S)}$ are utilized to perform the precoding operations, which means $V_{RF} = V_{RF}^{(S)}$ and $V_{BB} = V_{BB}^{(S)}$ when the precoding operations are performed.

To solve problem (1), it is assumed that $V_{BB}^{(0)} = [\gamma I\ 0]^T$, where I within $V_{BB}^{(0)}$ is an identity matrix with size $n_S$, 0 is a zero matrix with size $(n_{RF} - n_S) \times n_S$, which can be viewed that the $n_S$ data streams are bypassed to the first $n_S$ RF chains, and the rest $(n_{RF} - n_S)$ RF chains currently have zero inputs.

In addition, by treating $V_{RF}$ as variable, the problem (1) is still a non-convex optimization problem, since the constant magnitude constraint (1c) is non-convex. One way to deal with such non-convexity is to relax the non-convex constant magnitude constraint and to solve the relaxed problem (1), and therefore a relaxed solution (beamforming matrix) $\tilde{V}_{RF}$ is obtained. Then, the computing circuit 12 may approximate the relax solution $\tilde{V}_{RF}$ by an approximated solution (beamforming matrix) $\hat{V}_{RF}$ which satisfies the constant magnitude constraint.

Figure 3:
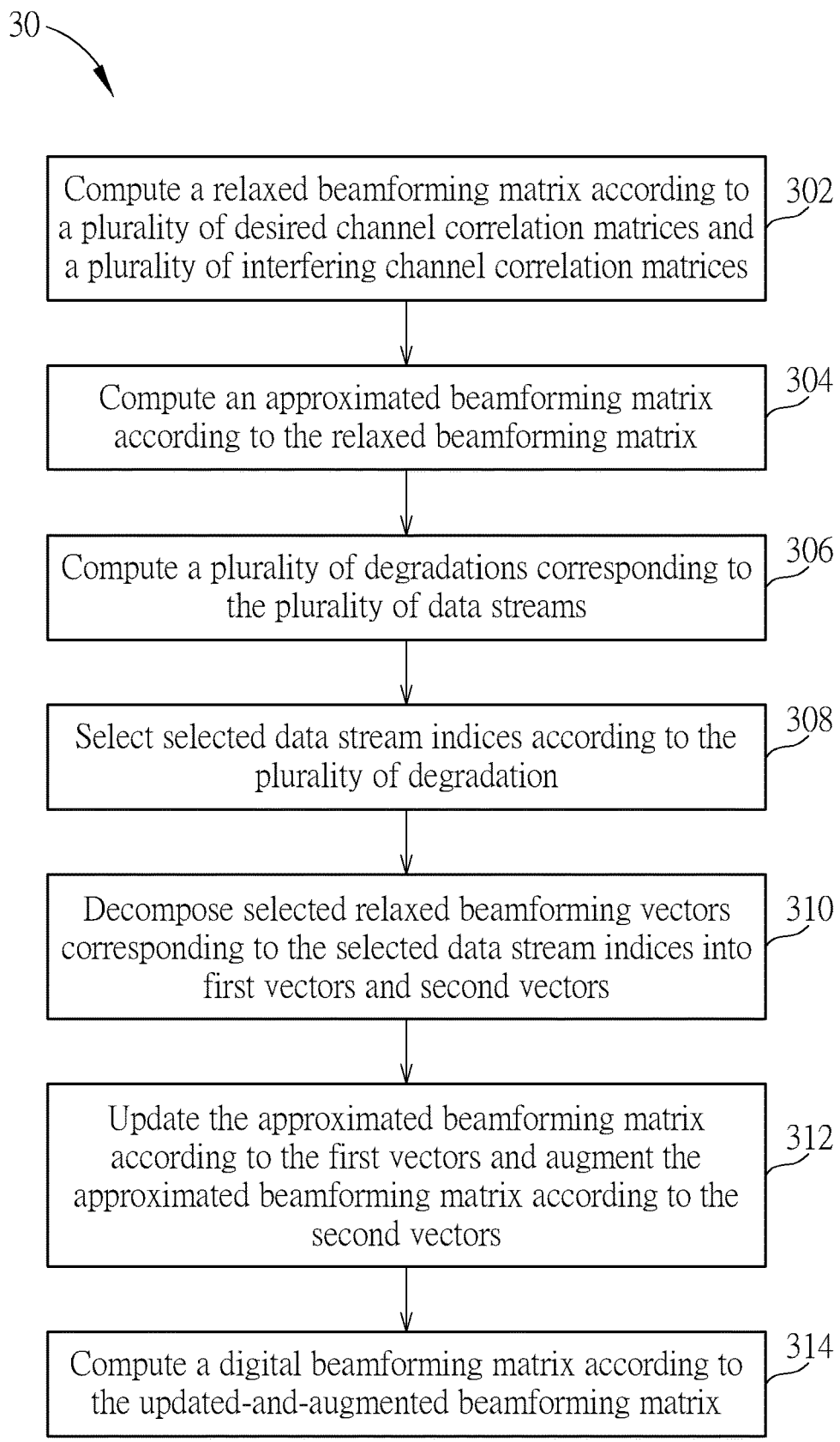
FIG. 3 is a schematic diagram of a process according to an embodiment of the present application.

FIG. 3 is a schematic diagram of a process 30 according to an embodiment of the present application. The process 30 may be compiled as the program code 124 and executed by the processing unit 120, to generate $V_{RF}$ and $V_{BB}$.

Step 302: Compute a relaxed beamforming matrix according to a plurality of desired channel correlation matrices and a plurality of interfering channel correlation matrices.

Step 304: Compute an approximated beamforming matrix according to the relaxed beamforming matrix.

Step 306: Compute a plurality of degradations corresponding to the plurality of data streams.

Step 308: Select selected data stream indices according to the plurality of degradations Step 310: Decompose selected relaxed beamforming vectors corresponding to the selected data stream indices into first vectors and second vectors.

Step 312: Update the approximated beamforming matrix according to the first vectors and augment the approximated beamforming matrix according to the second vectors.

Step 314: Compute a digital beamforming matrix according to the updated-and-augmented beamforming matrix.

In Step 302, the computing circuit 12 computes the relaxed beamforming matrix $\tilde{V}_{RF}$ according to a plurality of desired channel correlation matrices $G_1, \ldots, G_K$ and a plurality of interfering channel correlation matrices $Q_1, \ldots, Q_K$.

Note that, another issue of solving the relaxed problem (1) is that the precoding designs of maximizing sum rate for all users are inter-related, and therefore the computation complexity is barely affordable. Fortunately, the well-known uplink-downlink duality can be exploited to decouple the precoding designs for different users. That is, the relaxed problem (1) can be transformed into K independent problems. Each individual problem is corresponding to one user to maximize a virtual/equivalent uplink signal-to-interference-plus-noise ratio (SINR).

Figure 4:
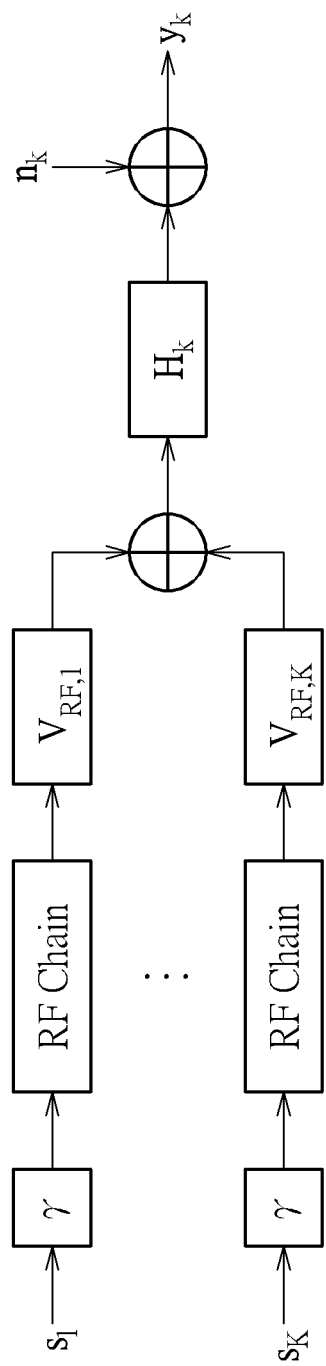
FIG. 4 is a schematic diagram of a system model of a downlink system.
Figure 5:
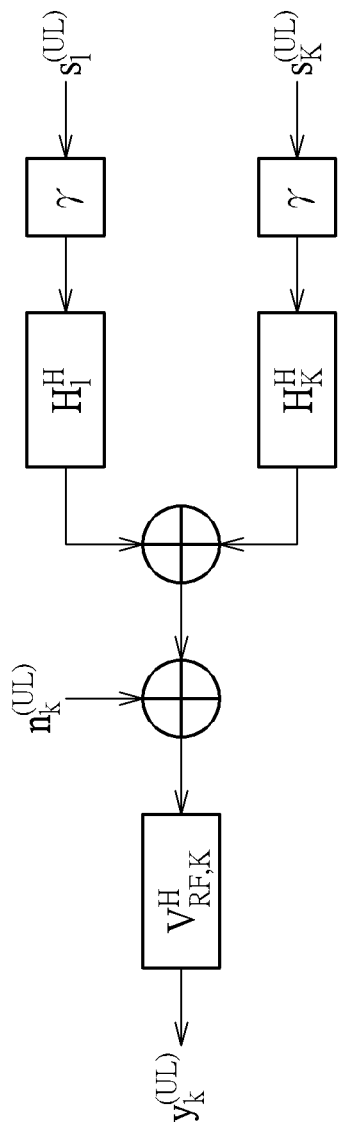
FIG. 5 is a schematic diagram of a system model of a virtual uplink system equivalent to the downlink system in FIG. 4.

The uplink-downlink duality is known in the art. FIG. 4 depicts a system model of a downlink system, and FIG. 5 depicts a virtual uplink system which is equivalent to the downlink system depicted in FIG. 4.

In the uplink direction, a virtual uplink received signal corresponding to the user k can be expressed as equation (5). In (5), $\gamma$ is referred to power allocated to each data stream and $\gamma$ may be assumed to be $\gamma = P_{max}/n_{RF}$ for simplicity. $V_{RF,k}$ can be viewed as a beamforming sub-matrix corresponding to the user k, where $V_{RF} = [8\ V_{RF,1}, \ldots, V_{RF,K}]$. Given (5), a virtual uplink SINR can be expressed as equation (6), where $s_k^{(UL)} \sim CN(0, I)$ is assumed. In (6), $G_k = \gamma^2 H_k^H H_k$ is proportional to a correlation matrix of the desired channel $H_k$ (in the user k's perspective), and named as desired channel correlation matrix (corresponding to the user k). $Q_k$ (corresponding to the user k) is named as interfering channel correlation matrix, which is expressed as equation (7). Mathematically, the relaxed SINR maximization problem for the user k can be formulated as equation (8).

$$y_k^{(UL)} = V_{RF,k}^H \left( \gamma \sum_{k=1}^{K} H_k^H s_k^{(UL)} + n_k \right) \quad (5)$$

$$SINR_k^{(UL)} = \frac{tr(V_{RF,k}^H G_k V_{RF,k})}{tr(V_{RF,k}^H Q_k V_{RF,k})} \quad (6)$$

$$Q_k = \sum_{k'=1, k' \neq k}^{K} \gamma^2 H_{k'}^H H_{k'} + \sigma_n^2 I \quad (7)$$

$$\max_{\tilde{V}_{RF,k}} SINR_k^{(UL)} \quad (8)$$

In Step 302, the computing circuit 12 may solve the relaxed/unconstrained problem (8) for all users, and therefore obtains relaxed solutions (beamforming sub-matrices) $\tilde{V}_{RF,1}, \ldots, \tilde{V}_{RF,K}$. Hence, the computing circuit 12 would obtain the relaxed beamforming matrix $\tilde{V}_{RF} = [\tilde{V}_{RF,1}, \ldots, \tilde{V}_{RF,K}]$.

In an embodiment, the problem (8) can be reformulated into a QCQP (quadratically constrained quadratic program), which can be expressed as equations (9a)-(9b), where $\tilde{V}_{RF,k}^{[d_k]}$ denotes a beamforming vector corresponding to the $d_k$-th data stream of the user k within the beamforming sub-matrix $\tilde{V}_{RF,k}$, as equation (10) shows.

$$\max_{\tilde{V}_{RF,k}} \sum_{d_k=1}^{D_k} (\tilde{V}_{RF,k}^{[d_k]})^H G_k \tilde{V}_{RF,k}^{[d_k]} \tag{9a}$$

$$\text{s.t. } (\tilde{V}_{RF,k}^{[d_k]})^H Q_k \tilde{V}_{RF,k}^{[d_k]} = 1, \forall d_k \tag{9b}$$

$$\tilde{V}_{RF,k} = [\tilde{V}_{RF,k}^{[1]}, \ldots, \tilde{V}_{RF,k}^{[D_k]}] \tag{10}$$

Solving the problem (9) is to equate a first order derivative of a Lagrangian function of the problem (9) to 0, which is expressed in (11). The problem (9) would turn into a generalized eigenvalue problem expressed in (12). In other words, if $\tilde{V}_{RF,k}^{[d_k]}$ satisfies (12), then $\tilde{V}_{RF,k}^{[d_k]}$ is an optimal solution of the problem (9). In addition, if $\tilde{V}_{RF,k}^{[d_k]}$ satisfies (12), then $\tilde{V}_{RF,k}^{[d_k]}$ is a generalized eigenvector of a matrix pair $(C_k, Q_k)$ corresponding eigenvalue $\lambda_d$, where the matrix pair $(C_k, Q_k)$ comprises $C_k$ and $Q_k$. Note that, $\lambda_d$, which plays roles of both Lagrangian multiplier and eigenvalue, can be viewed as an objective virtual uplink SINR corresponding to the d-th data stream of user k, which can be understood by multiplying both sides of equation (12) by $(\tilde{V}_{RF,k}^{[d_k]})^H$ and dividing the multiplied both sides by $$(\tilde{V}_{RF,k}^{[d_k]})^H Q_k \tilde{V}_{RF,k}^{[d_k]}.$$

$$\frac{\partial}{\partial \tilde{V}_{RF,k}^{[d_k]}} \left( (\tilde{V}_{RF,k}^{[d_k]})^H G_k \tilde{V}_{RF,k}^{[d_k]} - \lambda_d (\tilde{V}_{RF,k}^{[d_k]})^H Q_k \tilde{V}_{RF,k}^{[d_k]} \right) = 0 \tag{11}$$

$$G_k \tilde{V}_{RF,k}^{[d_k]} = \lambda_d Q_k \tilde{V}_{RF,k}^{[d_k]} \tag{12}$$

In an embodiment, Step 302 comprises finding the generalized eigenvector of matrices $C_k$ and $Q_k$, which is expressed in (13), where $\text{eig}^{(d)}(A,B)$ returns a generalized eigenvector corresponding to the d-th large generalized eigenvalue of the matrices A and B.

$$\tilde{V}_{RF,k}^{[d_k]} = \text{eig}^{(dk)}(G_k, Q_k) \tag{13}$$

Further, in Step 302, the computing circuit 12 computes equation (13) for all $d_k=1, \ldots, D_k$, to obtain $\tilde{V}_{RF,k}$ according to (10), and computes equation (13) for all k, to obtain $\tilde{V}_{RF}$ as $\tilde{V}_{RF}=[V_{RF,1}, \ldots, \tilde{V}_{RF,K}]$. Thus, the computing circuit 12 may obtain the relaxed beamforming matrix $\tilde{V}_{RF}$.

Note that, the beamforming matrix $\tilde{V}_{RF}$ is a solution comprising the beamforming sub-matrices $\tilde{V}_{RF,k}$ which maximize the objectives $\text{SINR}_k^{(UL)}$. However, the solution $\tilde{V}_{RF}$ is usually not feasible for implementing the analog precoder 14 by phase shifters, since $\tilde{V}_{RF}$ usually does not satisfy the constant magnitude constraint.

In this regard, the computing circuit 12 may further approach $\tilde{V}_{RF}$ by an approximated beamforming matrix $\hat{V}_{RF}$ to satisfy the constant magnitude constraint. The computing circuit 12 may find $\hat{V}_{RF}$ which is closest to $\tilde{V}_{RF}$ and satisfies the constant magnitude constraint, e.g., equation (1c).

In an embodiment, the computing circuit 12 may turn to solve problem (14), and the problem (14) is equivalent to problem (15) because of equation (14b). In addition, a global optimal solution of the problem (15) can be expressed as equation (16a), where arg(X) is an element-wise argument/phase operator.

$$\min_{\hat{V}_{RF}} \| \tilde{V}_{RF} - \hat{V}_{RF} \| \tag{14a}$$

$$\text{s.t. } |\hat{V}_{RF}(p,q)| = 1, \forall p, q \tag{14b}$$

$$\min_{\hat{V}_{RF}} tr(\hat{V}_{RF}^H \tilde{V}_{RF}) \tag{15a}$$

$$\text{s.t. } |\hat{V}_{RF}(p,q)| = 1, \forall p, q \tag{15b}$$

$$\hat{V}_{RF} = \exp\{j\arg(\tilde{V}_{RF})\} \tag{16a}$$

In another embodiment, for finite resolution phase shifters within the analog precoder 14, the computing circuit 12 may compute equation (16b) to obtain a quantized value b and use the quantized value b and equation (16c) to obtain $\hat{V}_{RF}$, where B represents a number of bits corresponding to the finite resolution phase shifter and $BS=\{2^u | u=0, \ldots, B\}$.

$$b(p,q) = \underset{b \in BS}{\arg\min} \left| \arg(\tilde{V}_{RF}(p,q)) - \frac{2\pi b}{2^B} \right| \tag{16b}$$

$$\hat{V}_{RF}(p,q) = \exp\left\{ j\left(\frac{2\pi b}{2^B}\right) \right\} \tag{16c}$$

Note that, performing (16a) can be viewed as one kind of element-wise approximation operation on the relaxed beamforming matrix $\tilde{V}_{RF}$, while performing (16b) can be viewed as another. Performing (16a) and/or (16b) can guarantee that $|\arg(\tilde{V}_{RF}(p,q)) - \arg(\hat{V}_{RF}(p,q))| < \varepsilon$, where $\varepsilon$ stands for a certain threshold.

In short, in Step 304, the computing circuit 12 computes the approximated beamforming matrix $\hat{V}_{RF}$ by equation (16). Note that, after the approximation in Step 304 is performed, $\hat{V}_{RF}$ is no longer optimal. In other words, $\text{SINR}_k^{(UL)}(\hat{V}_{RF}) < \text{SINR}_k^{(UL)}(\tilde{V}_{RF})$. A difference between $\text{SINR}_k^{(UL)}(\tilde{V}_{RF})$ and $\text{SINR}_k^{(UL)}(\hat{V}_{RF})$ e.g., $\text{SINR}_k^{(UL)}(\tilde{V}_{RF}) - \text{SINR}_k^{(UL)}(\hat{V}_{RF})$ may be viewed as a kind of SINR degradation caused by the approximation in Step 304.

Note that, in Steps 302 and 304, $\tilde{V}_{RF}$ and $\hat{V}_{RF}$ are assumed to be $(n_T \times n_S)$ matrices, which means that outputs of the first $n_S$ RF chains are (about to be) precoded (via $\hat{V}_{RF}$), given $n_{RF} > n_S$. Furthermore, outputs of the rest $(n_{RF} - n_S)$ RF chains may be further precoded to compensate the SINR loss/degradation of the approximation made by Step 304.

In this regard, the computing circuit 12 may select the data streams whose SINR degrades worst due to the approximation stated in Step 302, and incorporate the outputs of the rest $(n_{RF} - n_S)$ RF chains into the precoding operation of the analog precoder 14 to compensate SINR degradation for those data streams.

In Step 306, the computing circuit 12 may compute a degradation $\Delta_d$ corresponding to the data stream d, where d is data stream index. The degradation $\Delta_d$ may be computed as equation (17). In (17), the data stream d represents the $d_k$-th data stream of user k, and d herein may be represented as $$d = \sum_{k'=1}^{k-1} D_{k'} + d_k \text{ or } d = (k-1)D + d_k \text{ when } D_k = D \forall k.$$

The computing circuit 12 may compute equation (17) for all d=1, . . . , $n_S$, and therefore obtain degradations $\Delta_1, \ldots, \Delta_{nS}$ for all d=1, . . . , $n_S$.

$$\Delta_d = SINR_k^{(UL)}(\tilde{V}_{RF,k}^{[d_k]}) - SINR_k^{(UL)}(\hat{V}_{RF,k}^{[d_k]}) \quad (17)$$

$$= \lambda_d - \frac{tr\left((\tilde{V}_{RF,k}^{[d_k]})^H G_k V_{RF,k}^{[d_k]}\right)}{tr\left((\tilde{V}_{RF,k}^{[d_k]})^H Q_k V_{RF,k}^{[d_k]}\right)}, \text{ where}$$

$$\lambda_d = \frac{(\tilde{V}_{RF,k}^{[d]})^H G_k \tilde{V}_{RF,k}^{[d]}}{(\tilde{V}_{RF,k}^{[d]})^H Q_k \tilde{V}_{RF,k}^{[d]}}$$

Note that, $SINR_k^{(UL)}(\tilde{V}_{RF,k}^{[d_k]})$ and $\lambda_d$ represent an optimal objective value according to the objective and the relaxed beamforming vector $\tilde{V}_{RF,k}^{[d_k]}$ corresponding to the data stream d, and $SINR_k^{(UL)}(\hat{V}_{RF,k}^{[d_k]})$ represents an approximated objective value according to the objective and the approximated beamforming vector $\hat{V}_{RF,k}^{[d_k]}$ corresponding to the data stream d.

Among the degradations $\Delta_d$ for d=1, . . . , $n_S$, in Step 308, the computing circuit 12 may select $(n_{RF}-n_S)$ data stream indices corresponding to the $(n_{RF}-n_S)$ largest degradations. Suppose that entries within a set $\{\Delta_d|d=1, \ldots, n_S\}$ is sorted and ordered such that a series of degradations $\Delta_{<1>} \ldots \geq \Delta_{<nS>}$ comply with $\Delta_{<1>} \geq \Delta_{<2>} \geq \ldots \geq \Delta_{<nS>}$. In such case, the computing circuit 12 may select data stream indices <1>, . . . , <$(n_{RF}-n_S)$> in Step 308, and form an index set S={<1>, . . . , <$(n_{RF}-n_S)$>}.

It is known that a non-magnitude-1 complex number $c=re^{j\alpha}$ with $0 \leq r \leq 2$ can be decomposed into two magnitude-1 complex number $e^{j\theta}$ and $e^{j\phi}$. That is, $c=re^{j\alpha}$ (with $0 \leq r \leq 2$) can be represented/decomposed as $c=e^{j\theta}+e^{j\phi}$. Given that, in Step 310, the computing circuit 12 decomposes a selected relaxed beamforming vector $\tilde{V}_{RF,k}^{[d]}$ for d $\in$ S (i.e., corresponding a selected data stream index) into a first vector $a_d$ and a second vector $b_d$, such that $V_{RF,k}^{[d]} = a_d + b_d$, where $a_d$ and $b_d$ comprises entries with magnitude-1. Supposed that $V_{RF,k}^{[d]} = [r_1 e^{j\alpha_1}, \ldots, r_{nT} e^{j\alpha_{nT}}]^T$ (where $\tilde{V}_{RF,k}^{[d]}$ may be normalized to satisfy $0 \leq r \leq 2$), $a_d$ and $b_d$ can be expressed as $a_d = [e^{j\theta_1}, \ldots, e^{j\theta_{nT}}]^T$ and $b_d = [e^{j\phi_1}, \ldots, e^{j\phi_{nT}}]^T$ (wherein nT within the above equations of $a_d$ and $b_d$ means $n_T$), the entries within $a_d$ and $b_d$ can be obtained by $\theta_m = \alpha_m + \cos^{-1}(r_m/2)$ and $\phi_m = \alpha_m - \cos^{-1}(r_m/2)$. In addition, the decomposition of $\tilde{V}_{RF,k}^{[d]} = a_d + b_d$ may be performed for all d $\in$ S (or equivalently, $\tilde{V}_{RF,k}^{[<t>]} = a_{<t>} + b_{<t>}$, <t>$\in$S, where t denotes an index of the ordered degradation set S).

In Step 312, the computing circuit 12 updates the approximated beamforming matrix according to the first vectors $a_d$ and augments the approximated beamforming matrix according to the second vectors $b_d$. For example, supposed that the approximated beamforming matrix $\hat{V}_{RF}$ may be expressed as $\hat{V}_{RF} = [\hat{V}_{RF}^{[1]}, \ldots, \hat{V}_{RF}^{[d]}, \ldots, \hat{V}_{RF}^{[nS]}]$ (wherein nS within the equation of $\hat{V}_{RF}$ above means $n_S$) for some d $\in$ S, the computing circuit 12 may replace the approximated beamforming vector $\hat{V}_{RF}^{[d]}$ with the first vector $a_d$ and augments $\hat{V}_{RF}$ by the second $b_d$. Taking d=<1> (the first element within the set S) as an example, the computing circuit 12 may obtain a temporary beamforming matrix as $[\hat{V}_{RF}^{[1]}, \ldots, a_d, \ldots, \hat{V}_{RF}^{[nS]}, b_d]$.

The updating and augmenting operation may be performed for all d $\in$S. Finally, the computing circuit 12 may obtain an updated-and-augmented beamforming matrix $V_{RF,UnA}$, where the d-th column of $V_{RF,UnA}$, denoted as $V_{RF,UnA}^{[d]}$ may be expressed as equation (18). In (18)

$$V_{RF,UnA}^{[d]} = \begin{cases} \hat{V}_{RF}^{[d]}, & d \leq n_s, d \notin S, \\ a_d = a_{\langle t \rangle}, & d \leq n_s, d = \langle t \rangle \in S \\ b_{\langle t \rangle}, & d = n_s + t \end{cases} \quad (18)$$

The updated-and-augmented beamforming matrix $V_{RF,UnA}$ may be a solution $V_{RF}^{(S)}$ obtained by the computing circuit 12. In Step 314, the computing circuit 12 may substitute $V_{RF} = V_{RF}^{(S)} = V_{RF,UnA}$ into equations (1a)-(1c) as constant and solve problem (1) by treating $V_{BB}$ as variable, in order to obtain a solution of $V_{BB}^{(S)}$, a digital precoding matrix, such that the digital precoder 16 may perform the precoding operation according to the digital precoding matrix $V_{BB}^{(s)}$.

Specifically, in Step 314, the computing circuit 12 may compute effect channels $\bar{H}_k = H_k V_{RF}$ from the base station 10 to the user k for all k and solve the problem expressed in (19). Solving the problem (19) involves zero-forcing beamforming/precoding and water-filling power allocation techniques, which are known in the art and not narrated herein for brevity.

$$\max_{V_{BB}} \sum_{k=1}^{K} \left| I + \frac{\bar{H}_k V_{BB,k} V_{BB,k}^H \bar{H}_k^H}{\sum_{k'=1, k' \neq k}^{K} \bar{H}_k V_{BB,k'} V_{BB,k'}^H \bar{H}_k^H} \right| \quad (19a)$$

$$\text{s.t.} \quad tr(xx^H) \leq P_{max} \quad (19b)$$

Performing the process 30 may achieve better performance in terms of sum rate (which outperforms over an existing low-complexity hybrid precoding in massive multiuser MIMO solution, published by Liang et al. in *IEEE Wireless Communication Letter*, pp. 653-656, 2014 and an existing iterative hybrid precoding solution, published by Sohrabi et al. in *IEEE Journal Selected Topics in Signal Processing*, vol. 10(3), pp. 501-516, 2016, denoted as Iterative solution) while consume lower computation complexity, compared to the Iterative solution).

In summary, the present application relaxes the constant magnitude constraint and utilizes the uplink-downlink duality to solve the unconstrained maximum sum rate precoding problem to obtain the relaxed beamforming matrix, approximates the relaxed beamforming matrix to obtain the approximated beamforming matrix, chooses the data stream with objective SINR performance degrades worst, and exploits extra RF chain to compensate the degradation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A precoding method, applied in a base station, wherein the base station comprises a computing circuit, an analog precoder, a plurality of antennas and a plurality of radio frequency (RF) chains, the analog precoder is coupled between the plurality of antennas and the plurality of RF chains, and the base station transmits a plurality of data streams toward the plurality of users, the precoding method comprising:

computing a relaxed beamforming matrix according to a plurality of desired channel correlation matrices and a plurality of interfering channel correlation matrices, wherein the relaxed beamforming matrix comprises a plurality of relaxed beamforming sub-matrices corresponding to the plurality of users, one relaxed beamforming sub-matrix is generated according to a desired channel correlation matrix and an interfering channel correlation matrix corresponding to one user;

computing an approximated beamforming matrix according to the relaxed beamforming matrix, wherein entries within the approximated beamforming matrix have a constant magnitude;

computing a plurality of degradations corresponding to the plurality of data streams according to a plurality of relaxed beamforming vectors within the relaxed beamforming matrix and a plurality of approximated beamforming vectors within the approximated beamforming matrix;

selecting a selected data stream index according to the plurality of degradations;

decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix;

wherein the analog precoder performs a first precoding operation according to the updated-and-augmented beamforming matrix.

2. The precoding method of claim 1, wherein the step of computing the relaxed beamforming matrix according to the plurality of desired channel correlation matrices and the plurality of interfering channel correlation matrices comprises:

performing a generalized eigenvalue decomposition on a first desired channel correlation matrix and a first interfering channel correlation matrix corresponding to a first user, to obtain at least a generalized eigenvector; and forming the at least a generalized eigenvector as a first relaxed beamforming sub-matrix corresponding to a first user.

3. The precoding method of claim 1, wherein the step of computing the approximated beamforming matrix according to the relaxed beamforming matrix comprises:

performing an element-wise approximation operation on the relaxed beamforming matrix, to obtain the approximated beamforming matrix; and wherein a difference between a phase of an entry of the approximated beamforming matrix and a phase of an entry of the relaxed beamforming matrix is less than a threshold.

4. The precoding method of claim 1, wherein the step of computing the plurality of degradations comprises:

obtaining an optimal objective value according to the objective and a first relaxed beamforming vector within the relaxed beamforming matrix corresponding to a first data stream;

obtaining an approximated objective value according to the objective and a first approximated beamforming vector corresponding to the first data stream; and compute a first degradation corresponding to the first data stream as the optimal objective value minus the approximated objective value.

5. The precoding method of claim 1, wherein the objective is a virtual uplink signal-to-interference-plus-noise ratio corresponding to the user.

6. The precoding method of claim 1, wherein the selected data stream index is corresponding to a first degradation which is a largest degradation among the plurality of degradations.

7. The precoding method of claim 1, wherein the step of updating the approximated beamforming matrix according to the first vector comprises:

replacing an approximated beamforming vector corresponding to the selected data stream index with the first vector.

8. The precoding method of claim 1, further comprising:

selecting a plurality of selected data stream indices according to the plurality of degradations, wherein the plurality of selected data stream indices are corresponding to a plurality of first degradations which are larger other degradations among the plurality of degradations;

decomposing a plurality of selected relaxed beamforming vectors, which are within the relaxed beamforming matrix and corresponding to the plurality of selected data stream indices, into a plurality of first vectors and a plurality of second vectors, wherein entries within the plurality of first vectors and the plurality of second vectors have a constant magnitude; and updating the approximated beamforming matrix according to the plurality of first vectors and augmenting the approximated beamforming matrix according to the plurality of second vectors, to obtain the updated-and-augmented beamforming matrix.

9. The precoding method of claim 1, wherein the base station comprises a digital precoder, the precoding method further comprising:

the computing circuit computing a digital precoding matrix according to the updated-and-augmented beamforming matrix; and the digital precoder performing a second precoding operation according to the digital precoding matrix.

10. A base station, comprising:

a plurality of antennas;

a plurality of radio frequency (RF) chains;

an analog precoder, coupled between the plurality of antennas and the plurality of RF chains, configured to perform a first precoding operation;

a computing circuit, configured to perform the following steps:

computing a relaxed beamforming matrix according to a plurality of desired channel correlation matrices and a plurality of interfering channel correlation matrices, wherein the relaxed beamforming matrix comprises a plurality of relaxed beamforming sub-matrices corresponding to the plurality of users, one relaxed beamforming sub-matrix is generated according to a desired channel correlation matrix and an interfering channel correlation matrix corresponding to one user;

computing an approximated beamforming matrix according to the relaxed beamforming matrix, wherein entries within the approximated beamforming matrix have a constant magnitude;

computing a plurality of degradations corresponding to the plurality of data streams according to a plurality of relaxed beamforming vectors within the relaxed beamforming matrix and a plurality of approximated beamforming vectors within the approximated beamforming matrix;

selecting a selected data stream index according to the plurality of degradations;

decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix;

wherein the analog precoder performs the first precoding operation according to the updated-and-augmented beamforming matrix.

11. The base station of claim 10, wherein the computing circuit is further configured to perform the following steps, to compute the relaxed beamforming matrix according to the plurality of desired channel correlation matrices and the plurality of interfering channel correlation matrices:

performing a generalized eigenvalue decomposition on a first desired channel correlation matrix and a first interfering channel correlation matrix corresponding to a first user, to obtain at least a generalized eigenvector; and forming the at least a generalized eigenvector as a first relaxed beamforming sub-matrix corresponding to a first user.

12. The base station of claim 10, wherein the computing circuit is further configured to perform the following step, to compute the approximated beamforming matrix according to the relaxed beamforming matrix:

performing an element-wise approximation operation on the relaxed beamforming matrix, to obtain the approximated beamforming matrix; and wherein a difference between a phase of an entry of the approximated beamforming matrix and a phase of an entry of the relaxed beamforming matrix is less than a threshold.

13. The base station of claim 10, wherein the computing circuit is further configured to perform the following steps, to compute the plurality of degradations:

obtaining an optimal objective value according to the objective and a first relaxed beamforming vector within the relaxed beamforming matrix corresponding to a first data stream;

obtaining an approximated objective value according to the objective and a first approximated beamforming vector corresponding to the first data stream; and compute a first degradation corresponding to the first data stream as the optimal objective value minus the approximated objective value.

14. The base station of claim 10, wherein the computing circuit is further configured to perform the following step, to update the approximated beamforming matrix ($V_{RF\_aprox}$) according to the first vector:

replacing an approximated beamforming vector corresponding to the selected data stream index with the first vector.

15. The base station of claim 10, comprising a digital precoder, wherein the computing circuit computes a digital precoding matrix according to the updated-and-augmented beamforming matrix, and the digital precoder performs a second precoding operation according to the digital precoding matrix.

16. A computing circuit, disposed within a base station, wherein the base station comprises a computing circuit, an analog precoder, a plurality of antennas and a plurality of radio frequency (RF) chains, the analog precoder is coupled between the plurality of antennas and the plurality of RF chains, the computing circuit comprising:

a processing unit; and a memory, configured to store a program code, wherein the computing circuit is further configured to perform the following steps:

computing a relaxed beamforming matrix according to a plurality of desired channel correlation matrices and a plurality of interfering channel correlation matrices, wherein the relaxed beamforming matrix comprises a plurality of relaxed beamforming sub-matrices corresponding to the plurality of users, one relaxed beamforming sub-matrix is generated according to a desired channel correlation matrix and an interfering channel correlation matrix corresponding to one user;

computing an approximated beamforming matrix according to the relaxed beamforming matrix, wherein entries within the approximated beamforming matrix have a constant magnitude;

computing a plurality of degradations corresponding to the plurality of data streams according to a plurality of relaxed beamforming vectors within the relaxed beamforming matrix and a plurality of approximated beamforming vectors within the approximated beamforming matrix;

selecting a selected data stream index according to the plurality of degradations;

decomposing a selected relaxed beamforming vector corresponding to the selected data stream index into a first vector and a second vector, wherein entries within the first vector and the second vector have a constant magnitude; and updating the approximated beamforming matrix according to the first vector and augmenting the approximated beamforming matrix according to the second vector, to obtain an updated-and-augmented beamforming matrix;

wherein the analog precoder performs a first precoding operation according to the updated-and-augmented beamforming matrix.

17. The computing circuit of claim 16, wherein the program code instructs the processing unit to perform the following steps, to perform the following steps, to compute the relaxed beamforming matrix according to the plurality of desired channel correlation matrices and the plurality of interfering channel correlation matrices:

performing a generalized eigenvalue decomposition on a first desired channel correlation matrix and a first interfering channel correlation matrix corresponding to a first user, to obtain at least a generalized eigenvector; and forming the at least a generalized eigenvector as a first relaxed beamforming sub-matrix corresponding to a first user.

18. The computing circuit of claim 16, wherein the program code instructs the processing unit to perform the following step, to compute the approximated beamforming matrix according to the relaxed beamforming matrix:

performing an element-wise approximation operation on the relaxed beamforming matrix, to obtain the approximated beamforming matrix; and wherein a difference between a phase of an entry of the approximated beamforming matrix and a phase of an entry of the relaxed beamforming matrix is less than a threshold.

19. The computing circuit of claim 16, wherein the program code instructs the processing unit to perform the following steps, to compute the plurality of degradations:
   obtaining an optimal objective value according to the objective and a first relaxed beamforming vector within the relaxed beamforming matrix corresponding to a first data stream;
   obtaining an approximated objective value according to the objective and a first approximated beamforming vector corresponding to the first data stream; and
   compute a first degradation corresponding to the first data stream as the optimal objective value minus the approximated objective value.

20. The computing circuit of claim 16, wherein the program code instructs the processing unit to perform the following step, to update the approximated beamforming matrix according to the first vector:
   replacing an approximated beamforming vector corresponding to the selected data stream index with the first vector.

* * * * *